United States Patent
Seiwert et al.

(10) Patent No.: US 11,745,280 B2
(45) Date of Patent: Sep. 5, 2023

(54) METHOD FOR MANUFACTURING A HEAT EXCHANGER HAVING A TEMPERATURE PROBE

(71) Applicant: L'Air Liquide, Société Anonyme pour l'Etude et l'Exploitation des Procédés Georges Claude, Paris (FR)

(72) Inventors: Jacopo Seiwert, Versailles (FR); Marc Wagner, Saint Maur des Fosses (FR); Marie-Adelaide Cremieux, Jouy-en-Josas (FR); Younes Belmekki, Vélizy-Villacoublay (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 154 days.

(21) Appl. No.: 17/320,766

(22) Filed: May 14, 2021

(65) Prior Publication Data
US 2021/0354224 A1  Nov. 18, 2021

(30) Foreign Application Priority Data
May 15, 2020  (FR) ...................... 2004870

(51) Int. Cl.
*B23K 1/00* (2006.01)
*F28D 9/00* (2006.01)
(Continued)

(52) U.S. Cl.
CPC .......... *B23K 1/0012* (2013.01); *F28D 9/0043* (2013.01); *F28F 3/025* (2013.01);
(Continued)

(58) Field of Classification Search
CPC .. B23K 1/0012; B23K 2101/14; B23K 1/008; B23K 1/0008; B23K 3/06; B23K 3/08;
(Continued)

(56) References Cited

U.S. PATENT DOCUMENTS 11,221,178 B2 * 1/2022 Haik-Beraud ........ F28D 9/0068
2013/0075054 A1  3/2013 Fox et al.
(Continued)

FOREIGN PATENT DOCUMENTS

DE  10 2016 000246  7/2017
EP       1 319 890   6/2003
JP     2014 169809   9/2014

OTHER PUBLICATIONS

French Search Report for corresponding FR 2004870, dated Jan. 22, 2021.

*Primary Examiner* — Lee A Holly
(74) *Attorney, Agent, or Firm* — Elwood L. Haynes

(57) ABSTRACT

The invention relates to a method for manufacturing a heat exchanger including stacking a set of plates parallel to one another and to a longitudinal direction so as to define a plurality of passages suitable for the flow in the longitudinal direction of a first fluid to be brought into a heat-exchange relationship with at least a second fluid, said plates being delimited by a pair of longitudinal edges extending in the longitudinal direction and a pair of lateral edges extending in a lateral direction perpendicular to the longitudinal direction, and forming at least one of the plates by superposing at least a first flat product and a second flat product on top of one another, having at least one groove that extends parallel to the plates and leads towards the outside of the stack through at least one opening in a lateral or longitudinal edge.

12 Claims, 5 Drawing Sheets

(51) Int. Cl.
 *F28F 3/02* (2006.01)
 *F28F 21/08* (2006.01)
 *F28F 27/00* (2006.01)

(52) U.S. Cl.
 CPC .......... *F28F 21/083* (2013.01); *F28F 21/084* (2013.01); *F28F 21/087* (2013.01); *F28F 27/00* (2013.01); *F28F 2275/04* (2013.01)

(58) Field of Classification Search
 CPC ........ F28D 9/0043; F28D 9/0062; F28D 9/00; F28F 3/025; F28F 21/083; F28F 21/084; F28F 21/087; F28F 27/00; F28F 2275/04; F28F 2275/045; F28F 3/08; F28F 9/26; F28F 2275/06; G01K 7/02; G01K 7/16; G01K 7/18
 See application file for complete search history.

(56) References Cited

U.S. PATENT DOCUMENTS

2015/0241141 A1* 8/2015 FLuggen ................ F28F 27/00
 165/287
2018/0283816 A1 10/2018 Victor et al.

* cited by examiner

Fig. 3
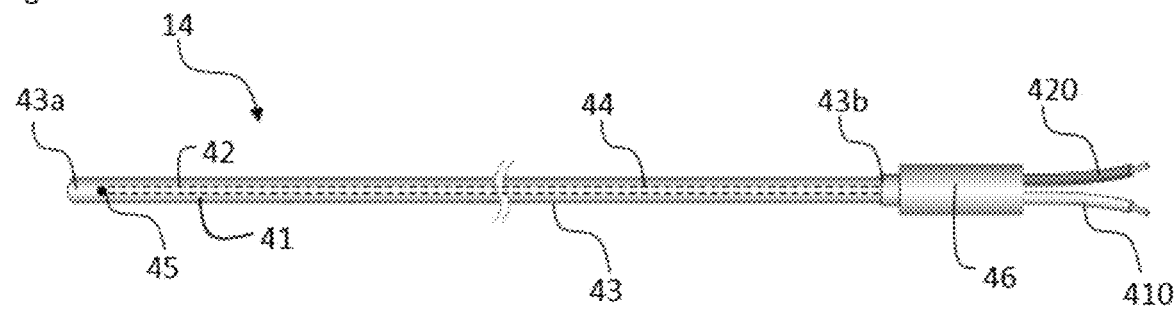
(a)
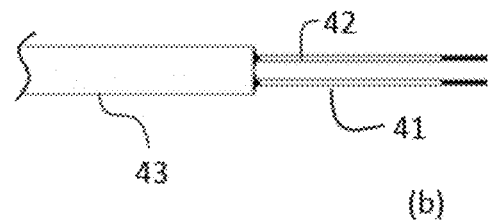
(b)
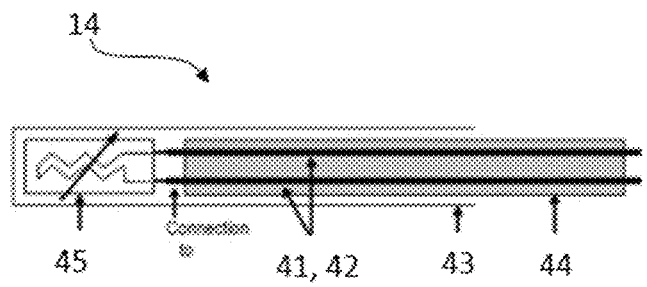
(c)

METHOD FOR MANUFACTURING A HEAT EXCHANGER HAVING A TEMPERATURE PROBE

CROSS REFERENCE TO RELATED APPLICATIONS

This application claims the benefit of priority under 35 U.S.C. § 119 (a) and (b) to French Patent Application No. 2004870, filed May 15, 2020, the entire contents of which are incorporated herein by reference.

BACKGROUND

The present invention relates to a method for manufacturing a heat exchanger of the brazed plate type, having at least one temperature probe for taking temperature and/or thermal flow measurements within the heat exchanger, and to a heat exchanger allowing these measurements to be taken.

The present invention notably finds application in the field of the cryogenic separation of gases, in particular the cryogenic separation of air, in what is known as an ASU (air separation unit) used to produce pressurized gaseous oxygen. In particular, the present invention may apply to the manufacture of a heat exchanger that vaporizes a flow of liquid, for example liquid oxygen, nitrogen and/or argon, by exchanging heat with a gaseous flow, for example air or nitrogen.

The present invention may also apply to a heat exchanger that vaporizes at least one flow of liquid-gas mixture, in particular a flow of multi-constituent mixture, for example a mixture of hydrocarbons, through exchange of heat with at least one other fluid, for example natural gas.

A technology that is commonly used for heat exchangers is that of brazed plate heat exchangers, which make it possible to obtain highly compact components that afford a large heat-exchange surface area and low-pressure losses. These heat exchangers are formed by a set of parallel plates between which spacer elements, such as corrugated structures or corrugations, which form fin heat exchange structures, are generally inserted. The stacked plates form, between one another, a stack of flat passages for different fluids to be brought into a heat exchange relationship.

During the manufacture of the heat exchanger, the plates, the fin spacer elements and the other constituent elements of the heat exchanger are pressed against one another and are subsequently joined together by brazing in a vacuum furnace at temperatures that may be between 550 and 900° C.

On account of their compactness and their monolithic construction, it is very difficult to take local measurements of temperatures or of heat flows within these brazed heat exchangers. Thus, in the vast majority of the methods in which they are implemented, the operator can access only the total thermal power exchanged between fluids, by virtue of an energy balance that is achieved between the inlet and the outlet of each fluid.

This makes it much harder to characterize these heat exchangers and does not make it possible, for example, to separately measure the heat-exchange coefficient of each of the passages.

During use, the lack of local data limits the control possibilities for the method. In particular, certain particular physical phenomena that can occur within the heat exchanger, such as phase changes or chemical reactions, manifest themselves in a local variation of the heat flow or of the temperature, which also depends on the position in question in the heat exchanger.

The local measurement of temperatures or of heat flows would allow in situ detection of poor operating conditions of the heat exchangers: poor distribution of the fluids, reduction in the performance of certain areas of the heat exchanger due, for example, to blocking or local distillation phenomena. It also would be helpful to benefit from local measurements of temperatures or of heat flows in order to monitor the change in performance of plate and fin heat exchangers during their lifetime.

In the face of these requirements, it has been found that the existing temperature measurement solutions are not entirely satisfactory, in particular on account of the complexity of the retaining components that are used or the implementation thereof.

"In situ" temperature measurement methods exist, but they currently only allow the temperature within the fluids to be measured. They are also intrusive, since they modify the flows of the fluids within the heat exchange passages. Furthermore, because they are not provided from the time of construction of the exchanger, their implementation is relatively complex, expensive and not very robust.

Methods for measuring heat flows exist, but they involve interposing a probe between the passages of the heat exchanger. It is no longer possible to braze the heat exchanger as one part, meaning that it loses most of its advantages. Moreover, the probe also represents a significant additional cost and necessarily adds a thermal resistance that is not compatible with the typical heat-exchange coefficients of the heat exchangers in question. Finally, this solution is difficult to envisage on an industrial scale, when the heat exchangers have a large number of passages, in particular due to the difficulty of assembly.

Furthermore, the document JP-A-2014169809 discloses a heat exchanger comprising a temperature probe that is inserted into a tube, the tube itself being inserted into grooves made in a plate of the exchanger. The tube is brazed between two plates and then, once the brazing phase has been completed, the probe is introduced into the tube. This method presents a number of problems. The presence of the tube necessarily increases the thermal resistance between the plate, the temperature of which is intended to be measured, and the probe, this having a negative effect on the precision of the measurement. The tube also increases the space required for introducing the probe, thereby increasing the intrusive nature of the method.

SUMMARY

The particular aim of the present invention is to overcome all or some of the abovementioned problems by proposing a method for manufacturing a brazed plate heat exchanger that makes it possible to take measurements of local temperatures and/or measurements of thermal flows within the heat exchanger in a more precise manner, both in terms of the measured value and of the position in the heat exchanger, without disrupting the operation of the heat exchanger, or increasing its space requirement.

To this end, the subject of the invention is a method for manufacturing a heat exchanger of the brazed plate and fin type, comprising the following steps:

a) stacking, in a spaced-apart manner, a set of plates parallel to one another and to a longitudinal direction so as to define, between said plates, a plurality of passages suitable for the flow in the longitudinal direction of a first fluid to be brought into a heat-exchange relationship with at least a second fluid, said plates being delimited by a pair of longitudinal edges extending in the longitudinal direction and a pair of lateral edges extending in a lateral direction perpendicular to the longitudinal direction, b) forming at least one of the plates stacked in step a) by superposing, in a stacking direction perpendicular to the longitudinal and lateral directions, at least a first flat product and a second flat product on top of one another, at least one of the first and second flat products comprising at least one groove that extends parallel to the plates and leads towards the outside of the stack formed in step a) through at least one opening in a lateral or longitudinal edge, c) arranging at least one braze material between the first flat product and the second flat product, d) arranging at least one temperature probe in the groove, a free space being provided between at least a part of the temperature probe, for the one part, and the internal walls of the groove, for the other part, e) brazing the set of plates, including brazing the first flat product to the second flat product, with the braze material being melted and at least a part of the braze material diffusing in the first flat product and the second flat product, at least a part of the free space provided between the temperature probe and the internal walls of the groove being filled with solidified braze material.

Depending on the case, the heat exchanger according to the invention may comprise one or more of the following features:

- the temperature probe comprises:
  - a heat-sensitive part configured to measure the temperature of a surface of the plate formed in step b) at a desired location,
  - electrically conductive members configured to connect the heat-sensitive part to an electrical measurement circuit, and
  - a sheath forming a sleeve around the heat-sensitive part and around at least a part of the electrically conductive members, the sheath extending between a first end arranged at the heat-sensitive part and a second end arranged on the outside of the stack of plates, preferably the second end being situated at a distance of at least 100 mm from the opening.
- the sheath comprises a metal material chosen from: aluminium, nickel, platinum, tungsten, an aluminium alloy, a nickel alloy, a platinum alloy, a tungsten alloy, a stainless steel, a refractory steel.
- the sheath has a thickness of between 0.1 and 1 mm and/or an outside diameter of between 0.5 and 3 mm.
- the sheath has a length of between 100 and 10,000 mm.
- the sheath is deformable.
- the temperature probe comprises an electrically insulating material arranged between the sheath and the heat-sensitive part, said electrically insulating material being chosen from: a magnesium oxide, an aluminium oxide.
- the temperature probe is a thermocouple probe comprising a pair of conductive wires formed from different metals, the conductive wires being joined at a junction point, known as measurement junction, forming the heat-sensitive part of the temperature probe.
- the conductive wires are each connected to respective extension wires intended to be joined to the terminals of an electrical measurement circuit so as to form junctions known as reference junctions there, a connection piece forming a sleeve around the connections between the conductive wires and the respective extension wires thereof, said connection piece being connected to the second end of the sheath.
- the metals forming the conductive wires are configured to form a thermocouple probe of a type chosen from: type E, type J, type K, type N, type M, type R, type S, type B.
- the temperature probe is a resistance probe comprising a pair of conductive wires connected to a measurement resistor forming the heat-sensitive part of the temperature probe, the measurement resistor having, as resistance material, a ceramic material or a metal material, in particular platinum or a platinum alloy.
- step e) takes place in a brazing furnace, the stack of plates being situated in a first region of the furnace in which the maximum temperature during the brazing cycle is between 550 and 900° C., preferably between 550 and 650° C., and the second end of the sheath being situated in a second region in which the temperature is lower than said maximum temperature in the first region.

The invention also relates to a heat exchanger of the brazed plate and fin type, comprising a set of plates that are parallel to one another and to a longitudinal direction so as to define, between said plates, a plurality of passages suitable for the flow of a first fluid to be brought into a heat-exchange relationship with at least a second fluid, said plates being delimited by a pair of longitudinal edges extending in the longitudinal direction and a pair of lateral edges extending in a lateral direction perpendicular to the longitudinal direction, at least one of the plates being formed by at least a first flat product and a second flat product that are superposed on top of one another in a stacking direction perpendicular to the longitudinal and lateral directions and brazed by means of a coating or a sheet of braze material having a predetermined melting point that is arranged on at least one of the opposite surfaces thereof, at least one of the first and second flat products comprising at least one groove that extends parallel to the plates and leads towards the outside of the stack through at least one opening in a lateral or longitudinal edge, at least one temperature probe being arranged in the groove and at least a part of the space between the temperature probe and the internal walls of the groove being filled with solidified braze material.

In particular, the temperature probe may comprise a heat-sensitive part configured to measure the temperature of a surface of the plate formed in step b) at a desired location, electrically conductive members configured to connect the heat-sensitive part to an electrical measurement circuit, and a sheath forming a sleeve around the heat-sensitive part and at least a part of the electrically conductive members, the sheath extending between a first end arranged at the heat-sensitive part and a second end arranged on the outside of the stack of plates, preferably the second end being situated at a distance of at least 100 mm, preferably between 100 and 10,000 mm, from the opening.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 3 schematically shows temperature probes according to embodiments of the invention.

DETAILED DESCRIPTION OF PREFERRED EMBODIMENTS

Figure 1:
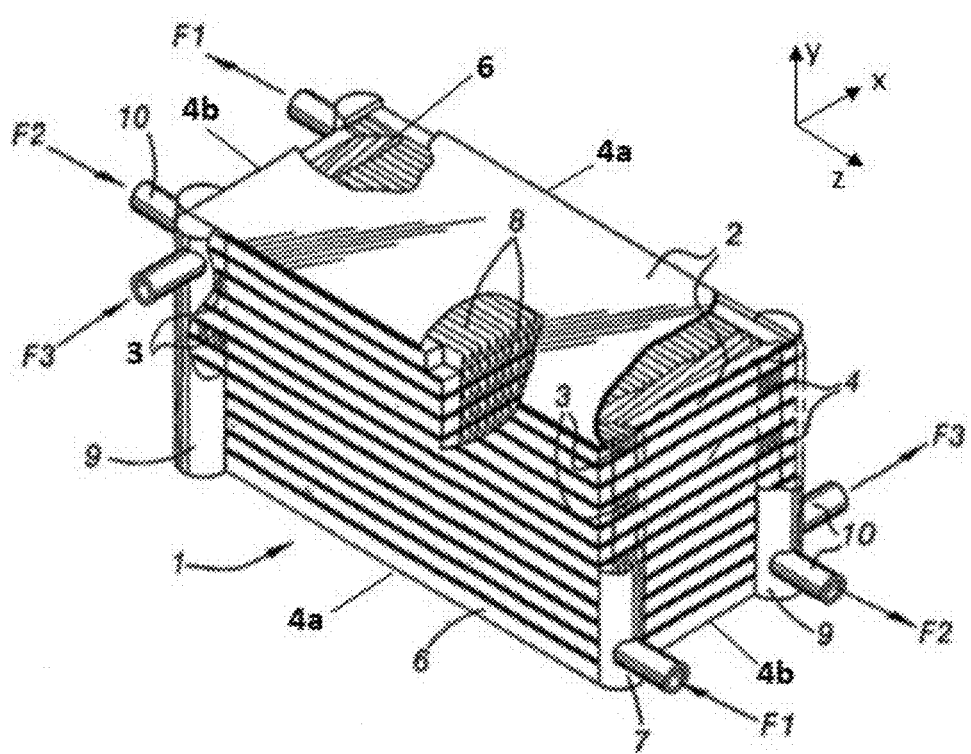
FIG. 1 is a three-dimensional view of a brazed plate heat exchanger that can be manufactured using a method according to the invention.

FIG. 1 shows a heat exchanger 1 of the brazed plate and fin type that comprises a stack of plates 2 that extend in two dimensions, length and width, in the longitudinal direction z and the lateral direction x, respectively. The plates 2 are disposed on top of one another, parallel to one another, and in a spaced-apart manner. They thus form a plurality of sets of passages 3 between one another, with some passages being provided for the flow of a first fluid F1 and other passages being provided for the flow of at least one other fluid F2, F3 to be brought into an indirect heat-exchange relationship with F1 via the plates 2. The lateral direction x is orthogonal to the longitudinal direction z and parallel to the plates 2. The fluids flow preferably along the length of the heat exchanger parallel to the longitudinal direction z.

Preferably, each passage has a flat and parallelepipedal shape. The spacing between two successive plates 2, corresponding to the height of the passage, measured in the stacking direction y of the plates 2, is small compared with the length and the width of each successive plate. The stacking direction y is orthogonal to the plates.

The passages 3 are bordered by closure bars 6 which do not completely obstruct the passages but leave free openings for the inlet or the outlet of the corresponding fluids. The plates 2 are delimited by peripheral edges 4, which are preferably parallel in pairs. The peripheral edges 4 comprise a pair of longitudinal edges 4a extending in the longitudinal direction z and a pair of lateral edges 4b extending in the lateral direction x.

The heat exchanger 1 comprises semi-tubular manifolds 7, 9 provided with inlets and outlets 10 for introducing fluids into the heat exchanger 1 and for discharging fluids out of the heat exchanger 1. These manifolds have openings that are narrower than the passages. Distribution zones arranged downstream of the inlet manifolds and upstream of the outlet manifolds are used to homogeneously channel the fluids to or from the entire width of the passages.

Figure 2:
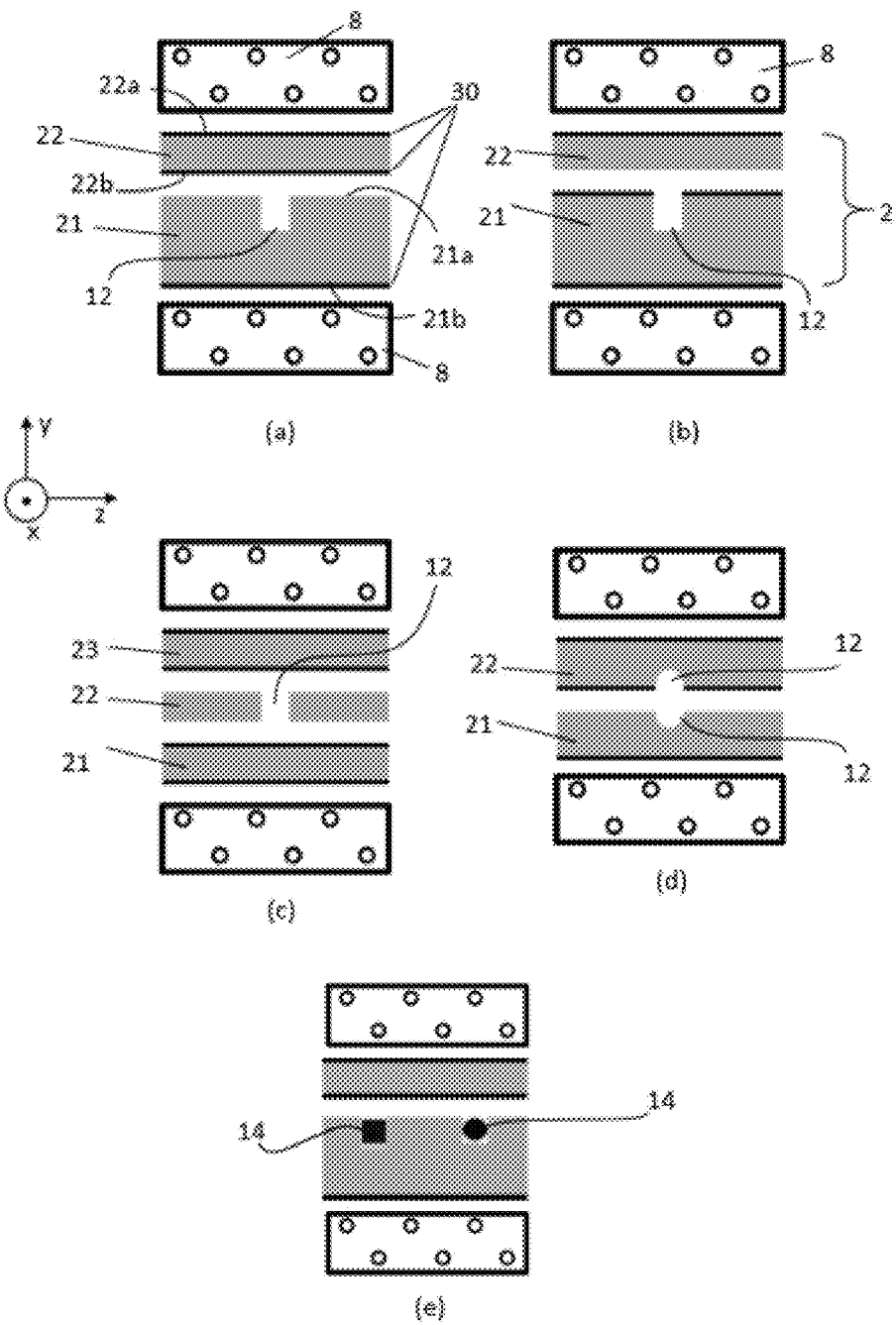
FIG. 2 schematically shows different embodiments of flat products and of grooves according to the invention.
Figure 4:
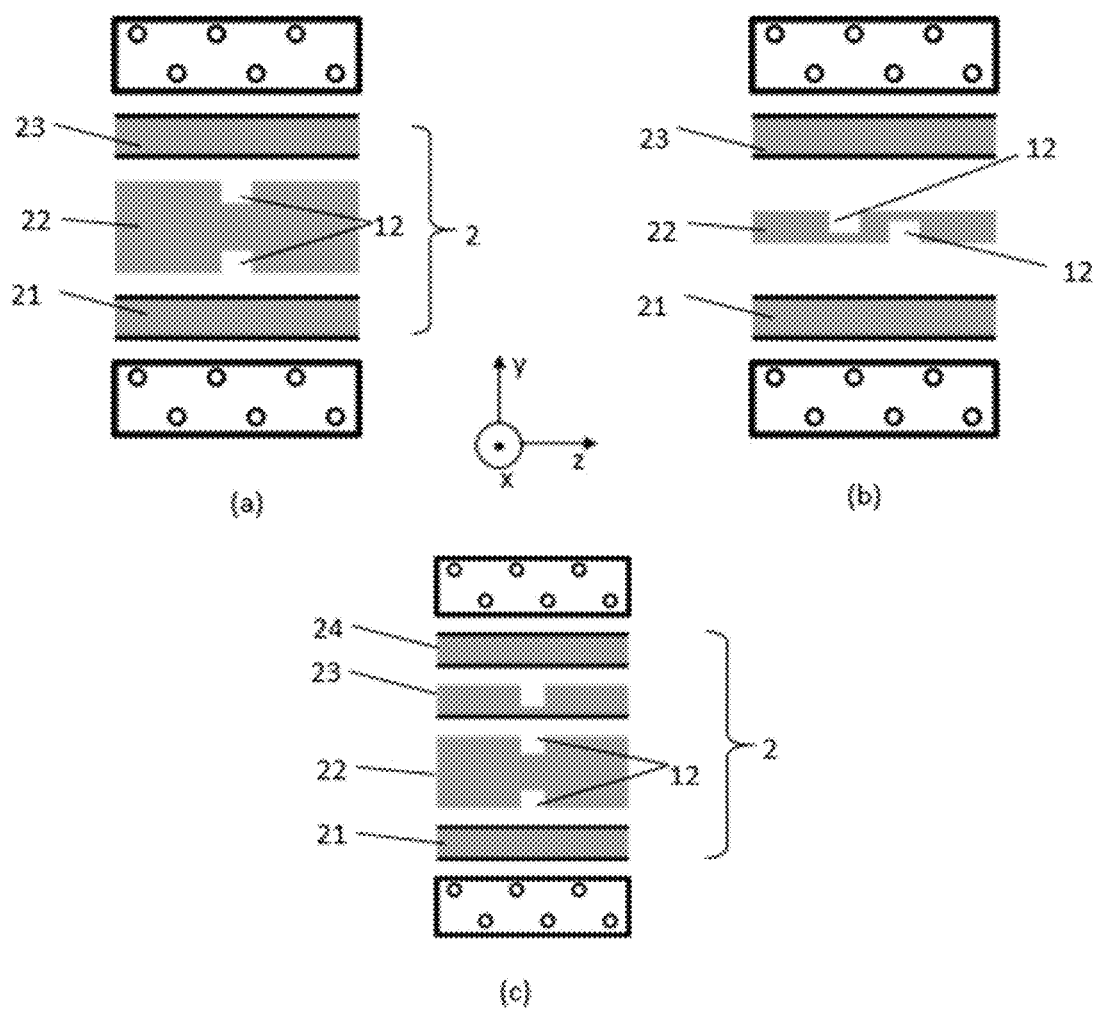
FIG. 4 schematically shows further embodiments of flat products and of grooves according to the invention.
Figure 5:
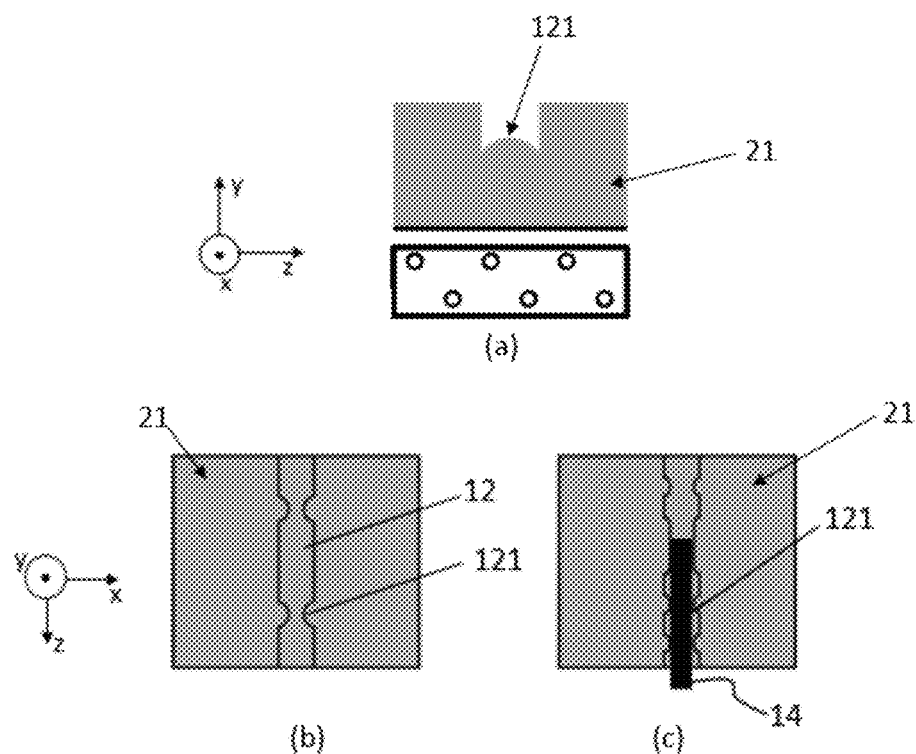
FIG. 5 schematically shows further embodiments of flat products and of grooves according to the invention.

Preferably, at least some of the passages 3 comprise fin spacer elements 8 that extend advantageously across the width and along the length of the passages of the heat exchanger, parallel to the plates 2. In the illustrated example, the spacer elements 8 comprise heat-exchange corrugations in the form of corrugated sheets. In this case, the corrugation legs that connect the successive tops and bottoms of the corrugation are referred to as "fins". The spacer elements 8 can also adopt other particular shapes that are defined according to the desired fluid flow characteristics. More generally, the term "fins" covers blades or other secondary heat-exchange surfaces, which extend from the primary heat-exchange surfaces, that is to say the plates of the heat exchanger, into the passages of the heat exchanger. Note that FIGS. 2, 4 and 5 show perforated straight corrugations 8 arranged in the passages of the heat exchangers situated on either side of the plate 2. Of course, any type of corrugation is conceivable, in particular non-perforated straight corrugations, "herringbone" corrugations, which are also called "wavy" corrugations, partially offset corrugations, etc.

During the manufacture of the heat exchanger 1, a set of plates 2 is provided that are stacked parallel to one another and to the longitudinal direction z. The plates 2 are spaced apart from each other by the closure bars 6. After the assembly of the other constituent elements of the heat exchangers, in particular the heat exchange corrugations, the distribution corrugations, etc., the stack is brazed in order to secure the elements of the heat exchangers to one another. Preferably, the plates and all or some of the other constituent elements of the heat exchanger are made of aluminium or of aluminium alloy.

At least one of the plates 2 of the heat exchanger is formed by superposing at least a first flat product 21 and a second flat product 22 on top of one another. The first and second flat products 21, 22 are brazed together and to the other plates 2, which are also brazed together preferably, the plate 2 formed by superposing flat products and the other plates 2 of the heat exchanger are brazed simultaneously. It is also conceivable to braze the flat products together, then to stack them with the other plates 2 and then to braze this stack.

As can be seen in the examples in FIG. 2, at least one of the first and second flat products 21, 22 comprises at least one groove 12. A groove may also be understood to be a furrow, a slot or a recess made in the thickness of the plate 2. The groove 12 extends parallel to the plates 2 and leads towards the outside of the stack through at least one opening 5 situated in a lateral or longitudinal edge 4a, 4b of the first flat product or of the second flat product, depending on the flat product in which the groove is provided. When the first flat product and the second flat product are superposed, the groove 12 forms a cavity within the plate 2, which is configured to receive at least one temperature probe 14.

The probe 14 and the groove 12 are configured such that there is a free space between at least a part of the temperature probe 14, for the one part, and the internal walls of the groove 12, for the other part. Specifically, the existence of a clearance between the probe 14 and the groove 12 is necessary to allow the introduction of the probe and limits the risk of deforming the stack. An irregular or asymmetric exterior shape of the probe and/or the fact that the shapes of the groove and of the probe are not perfectly complementary can also help to create free space around the probe 14. Some parts of the exterior surface of the probe may be in contact via the internal walls of the groove 12 and others not.

According to the invention, the temperature probe 14 is arranged in the groove 12 before the plates of the heat exchanger are brazed. The stack, which comprises said at least one plate 2 formed of superposed flat products with the probe 14 arranged between the flat products, is then brazed so as to join the various elements of the stack together. By arranging the probe directly in the groove 12, before brazing, additional manipulations of the stack once it has been brazed are avoided, thereby reducing the risk of it being damaged.

The set of plates 2 comprising the temperature probe 14 is then brazed, including the brazing of first flat product 21 to the second flat product 22.

During brazing, the constituent elements of the heat exchanger are connected using a filler metal, called braze or braze material 30, having a predetermined melting point. Preferably, the predetermined melting point is between 550 and 900° C., more preferably between 550 and 650° C.

The assembly is obtained by heating the braze material 30, which melts and diffuses within the parts to be brazed, without melting the latter. The braze material 30 can be in the form of coating layers that are deposited, generally by co-laminating or optionally in the form of a liquid solution or of a gel deposited by hand, onto surfaces of the plates or in the form of sheets or strips disposed between the plates. The plates, the fin spacer elements and the other constituent elements of the heat exchanger are preferably pressed together by a compression device that applies a compression force to the plates 2, typically of between 20,000 and 40,000 N/m². Preferably, the stack is introduced into a vacuum furnace and brazed at temperatures that may be between 550 and 900° C., preferably between 550 and 650° C. The braze material 30 is preferably aluminium or an aluminium alloy.

While it melts, the braze material 30, which is arranged between the first flat product 21 and the second flat product 22, flows around the probe 14 and fills at least a part of the space that exists between the temperature probe 14 and the internal walls of the groove 12. Note that the solidified braze material is arranged so as to be in direct thermal contact with the probe, for the one part, and with the walls of the groove, for the other part.

This ensures excellent thermal conduction between the temperature probe 14 and the flat products forming the plate of which the temperature is intended to be measured.

The temperature probe 14 is introduced directly into the groove without it being necessary to use an intermediate retaining component between the probe and the first and second flat products. This minimizes the thermal resistance between the probe and the flat products, thereby significantly improving the precision of the measurement. Moreover, brazing the first and second flat products together ensures excellent contact from the thermal perspective and limits thermal resistance, making it possible for there to be no negative effect on the performance of the heat exchanger in operation. The temperature probe is introduced non-intrusively into the heat exchanger. The probe is enclosed in a plate 2 of the heat exchanger, making it possible to measure a local temperature in the heat exchanger. The space requirement of the device is also minimized.

Note that, during brazing, the braze material 30 melts and diffuses within the flat products 21, 22. It is conceivable for the material 30 to also diffuse within the probe 14. However, it is also possible for the probe 14 not to be brazed, meaning that there is no diffusion of material 30 within the material of the probe 14.

Note that the probe 14 can be placed in the groove 12, either before the flat products are superposed or once the flat products have been superposed, through the opening 5.

Preferably, the probe 14 is placed in the groove after the flat products have been stacked and kept clamped together by a compression force, with a view to subsequently brazing the stack. This ensures that the flat products are properly in contact with one another before the probe is introduced, and avoids any moving of an element of the stack during the insertion of the probe 14, which could compromise the integrity of the brazed matrix and, as a result, the operation of the heat exchanger. This also makes it possible to ensure that the external dimensions of the probe are not too large compared with the internal dimensions of the groove.

Note that if there are several grooves 12, at least one probe 14 is provided per groove 12.

Within the scope of the present invention, the temperature probe 14 can be any probe configured to take temperature measurements through contact.

With reference to the examples in FIG. 3, the temperature probe 14 comprises a heat-sensitive part 45 configured to measure the temperature of a surface of the plate 2 formed in step b) at a desired location, The probe also comprises electrically conductive members 41, 42, the ends of which are electrically connected to the heat-sensitive part 45, for the one part, and are designed to be connected, for the other part, to an electrical measurement circuit which is located outside the stack in order not to be exposed to excessively high temperatures.

Preferably, the probe 14 comprises a sheath 43 forming a sleeve around the heat-sensitive part 45 and around at least a part of the electrically conductive members 41, 42. The sheath 43 has the purpose of protecting the most fragile elements of the probe during brazing. Note that the sheath 43 is a constituent element of the probe and that it is secured to the other constituent elements thereof, in particular the heat-sensitive part 45 and the conductive members 41, 42.

Note that it remains conceivable to use a probe formed of conductive members 41, 42 without a sheath, for example electrical wires that are insulated from one another and are joined to one another in the region of the heat-sensitive part. Preferably, in order for the electrical wires to be insulated from one another, they can be covered in particular with a vitreous material, a ceramic material, or a material based on polyamide or polytetrafluoroethylene. At least a part of the space left free around the wires in the groove is then filled with the braze material.

Preferably, the sheath 43 extends longitudinally between a first end 43*a* arranged at the heat-sensitive part 45 and a second end 43*b* arranged on the outside of the stack of plates 2, preferably at a distance of at least 100 mm from the opening 5 so as to make it possible to insulate it thermally, during brazing, from the rest of the heat exchanger. Thus, the other elements necessary for taking measurements, in particular the electric power supply devices, the devices for measuring voltage, are moved sufficiently far away from the stack in order not to subject them to excessively high temperatures during brazing.

In particular, the second end 43*b* can be arranged at a distance of between 100 and 10,000 mm from the opening 5, preferably between 500 and 5000 mm.

Note that, during brazing, the space that exists between the temperature probe 14 and the internal walls of the groove 12 is filled at least around the heat-sensitive part 45 since it is in this region that it is necessary to ensure the best thermal contact possible between the probe and the plate 2 of which the temperature is intended to be measured. Preferably, the sheath 43 is surrounded around its entire periphery with resolidified braze material 30, at least in the region of the heat-sensitive part 45.

Preferably, the sheath 43 comprises a metal material chosen from: aluminium, nickel, platinum, tungsten, niobium, molybdenum, tantalum, an alloy of the abovementioned metals, for example an alloy of nickel with chromium and iron, such as Inconel®, stainless steel, or refractory steel.

The cited materials afford different characteristics in terms of withstanding temperature, mechanical integrity, ease of manufacture and cost, which make it possible to adapt the material to the application.

Note that the sheath may or may not be brazed, meaning diffusion or a lack of diffusion of the braze material in the material of the sheath.

The material of the sheath may optionally be identical to that used for the rest of the heat exchanger, in order to optimize the brazing of this element, and therefore to reduce the thermal resistance between the probe and the flat products, this improving the representativeness of the temperature measurement. This makes it possible for the braze material to diffuse in the sheath and for excellent thermal contact between the flat products and the probe to be obtained. Good material homogeneity is also obtained, thereby avoiding any disruption of the temperature field. In particular, the sheath 43 and the plates of the heat exchanger could be formed from aluminium or aluminium alloy. The braze material will be aluminium or an aluminium alloy.

It is also possible for the sheath 43 to comprise a ceramic material, this type of material affording good temperature resistance.

In the scope of the invention, note that a "metal material" is understood to be a material formed from a pure metal or from a metal alloy.

The sheath 43 may have a thickness of between 0.1 mm and 1 mm and/or an outside diameter of between 0.25 and 3 mm. Its length may be at least 100 mm, preferably between 100 mm and 10 m, more preferably between 500 mm and 5 m, in order to make it possible to move the sensitive elements of the probe far enough away.

Thus, considering that the stack of plates 2 is situated in a first region 51 of the furnace in which the maximum temperature during the brazing cycle is between 550 and 900° C., preferably between 550 and 650° C., the second end 43b of the sheath 43 is moved away from the stack such that it is situated in a second region in which the temperature is lower than the maximum temperature in the first region 51. Preferably, the temperature in the second region is at least 50° C., more preferably at least 100° C., lower than the maximum temperature in the first region.

Preferably, the sheath 43 is deformable, making it easier to insert the probe into the groove, thereby reducing the risk of damaging or deforming the plate 2, and making it possible to follow any changes in direction of the groove, for example in the case of a groove 12 which has, in longitudinal section in a plane parallel to the plates 2, a profile having a plurality of rectilinear portions that form angles between one another and/or having at least one curved portion.

Preferably, the sheath 43 is configured to undergo, at least partially, elastic, i.e. reversible, deformation in order to allow the probe to move in the groove.

Preferably, an electrically insulating material 44 is arranged between the sheath 43 and the heat-sensitive part 45 in order to eliminate any risk of electrical short circuit between the various conductors and between the latter and the sheath. Said electrically insulating material 44 may be chosen from: a magnesium oxide, an aluminium oxide.

FIG. 3 schematically shows different types of temperature probes 14 that can be used in the scope of the invention.

According to one advantageous possibility, an example of which is visible in (a), the temperature probe 14 is a thermocouple probe comprising a pair of electrically conductive wires 41, 42 formed from different metals. The wires 41, 42 may optionally be bare. The conductive wires 41, 42 are joined, generally welded, at a junction point 45, known as measurement junction, which forms the heat-sensitive part of the temperature probe 14. The sheath 43 is filled with insulating material 44 and the wires 41, 42 are embedded therein. Thermocouple probes have the advantage of a low cost and good temperature resistance.

In the case illustrated in (a), the conductive wires 41, 42 are each connected to respective electrical extension wires 401, 402 that are intended to be joined to the terminals of an electrical measurement circuit so as to form junctions known as reference junctions there. A connection piece 46 forms a sleeve around the connections between the conductive wires 41, 42 and the respective extension wires 401, 402 thereof in order to protect them. The connection piece 46 is connected to the second end 43b of the sheath 43 and is situated outside the stack.

It is also conceivable, as can be seen in (b), for the thermocouple wires 41, 42 to protrude from the sheath 43 in order to be joined directly to the terminals of the measurement circuit.

Preferably, the metals forming the conductive wires 41, 42 are configured to form a thermocouple probe of a type chosen from: type E, type J, type K, type N, type M, type R, type S, type B, which all exhibit sufficient resistance to high temperatures.

According to another possibility, illustrated in (c), the temperature probe 14 is a resistance probe comprising at least two conductive wires 41, 42 connected to a measurement resistor 45 forming the heat-sensitive part of the probe 14. The measurement resistor 45 comprises, as resistance material, a ceramic material or a metal material, in particular platinum or a platinum alloy. In particular, the temperature probe 14 may be a platinum resistance temperature probe of the type PT100. In particular, a resistance probe having four electrically conductive wires (not illustrated) could be used. One pair of conductive wires serves to pass the electric current and the other pair serves to measure the voltage at the terminals of the heat-sensitive part. This type of probe affords even better precision. Preferably, the sheath 43 is formed entirely or partially from a first material having a melting point that is greater than said predetermined melting point of the braze material 30. Thus, its integrity is maintained during the brazing cycle. For example, the first material may be an iron alloy, such as stainless steel or refractory steel.

FIG. 2 shows various embodiments of flat products and of grooves. The grooves 12 may in particular have, in cross section in a plane orthogonal to the longitudinal direction z, cross sections of square, rectangular or semi-circular shape.

The shape of the grooves may be adapted depending on the shape of the probe 14 to be housed. It is also possible to adapt the depth of the grooves 12 and/or the thickness of the flat products in order to adapt them to the dimensions of the probe 14 and to place the probe 14 at a predetermined height within the plate 2, the height being measured parallel to the stacking direction y.

The flat products together form a plate 2 and spacer elements 8 are arranged in the fluid passages formed on either side of the plate 2. The first flat product 21 comprises a first pair of opposite surfaces 21a, 21b and the second flat product 22 comprises a second pair of opposite surfaces 22a, 22b. These surfaces are indicated only in (a) for the sake of simplicity.

A braze material 30 is arranged between the plates 2 and between the flat products forming a plate provided with a probe according to the invention.

Preferably, at least those surfaces of the flat products that are oriented towards the spacer elements 2 and at least one of the surfaces of a flat product that is oriented towards the other flat product comprise a braze material 30. It is also possible for the two surfaces of the flat products that are arranged facing one another to comprise a braze material 30.

FIG. 2(a) illustrates the case of a first flat product 21 comprising a groove 12 that leads out at the surface 21a of the first pair oriented towards the second flat product 22. The braze material 30 is disposed on that surface 22b of the second product 22 that is oriented towards the groove 12. According to another possibility illustrated in (b), the braze material 30 is disposed on the surface 21a at which the groove 12 leads out.

FIG. 2(e) illustrates probes 14 of square or circular section that are placed in a groove 12. Preferably, the probe 14 has a circular cross section and a cylindrical overall shape.

According to one possibility, illustrated in FIG. 2(d), the second flat product 22 may also comprise at least one groove 12 that is arranged facing said at least one groove 12 of the first flat product 21 and leads out at that one 22b of the surfaces of the second pair that is oriented towards the first flat product 21. Advantageously, the two grooves 12 have a semi-circular cross section. Such a configuration is particularly suited to the installation of a cylindrical probe 14.

FIG. 2(d) illustrates the case in which the plate 2 in which the temperature measurement is taken is formed by superposing a first flat product 21, a second flat product 22 and an additional flat product 23 on top of one another. The second flat product 22 is arranged between the first flat product 21 and the additional flat product 23.

According to one embodiment, the second flat product 22 comprises a through-groove 12. This makes it possible to precisely control the symmetric positioning of the probe in the plate when the temperature at the centre of the plate 2 is intended to be measured.

According to another embodiment, illustrated in FIG. 4, the second flat product 22 comprises at least two grooves 12, one of which leads out at that surface 22b of the second pair that is oriented towards the first flat product 21 and the other one of which leads out at that surface 22a of the second pair that is oriented towards the additional flat product 23. This allows two temperature probes 14 to be installed at different heights within the plate 2. On the basis of the difference in the temperatures measured by each of the probes, it is possible to deduce the thermal flow passing through the plate 2, the plate 2 acting as a thermal resistor.

Preferably, the two grooves 12 are disposed on either side of and at equal distances from the mid-plane of the plate 2, that is to say the plane that is parallel to the plates 2 of the stack and is arranged, in the stacking direction y, halfway up the plate 2 formed by the stack of flat products 21, 22, 23. The probes that are subsequently arranged are also positioned in this way. This makes it possible to measure the temperature difference that is generated through the plate, this leading directly or indirectly to the determination of the thermal flow passing through the plate.

The thickness of the second flat product 22 into which the probes are inserted, the distance between the probes and their precision can be selected in order to correspond to the desired measurement position and sensitivity.

According to one possibility, visible in FIG. 4 in (a), the grooves 12 of the pair of grooves are arranged in a coincident manner one above the other, but at different heights within the plate 2. The inserted probes 14 are thus positioned facing one another. The temperature difference between the two probes then depends on the thermal flow perpendicular to the mid-plane.

According to another possibility, visible in (b), the grooves 12 are offset with respect to one another in a plane parallel to the plates 2. This makes it possible to use a thinner second flat product and therefore to limit the thermal resistance of the second flat product and to have no impact on the performance of the heat exchanger.

According to another possibility, visible in (c), it is possible to arrange more than two probes 14 at different heights within the plate formed by the flat products, using a plurality of additional flat products. In fact, as many additional flat products are added to the stack as there are desired additional probes. This makes it possible to measure the thermal gradient with more than two measurement points, thereby further improving the precision of the measurement. This arrangement is also more robust and makes it possible to detect if one of the probes is faulty.

Thus, in the example in FIG. 4 (c), two additional flat products 23, 24 are superposed on the second flat product 22. One of the additional flat products 23, 24 comprises at least one groove 12 that leads out towards the other of the additional products 23, 24. This manner of superposition makes it possible to arrange three probes 14 on top of one another.

FIG. 5 schematically shows embodiments in which bosses 121 are provided on the internal wall of a groove 12 so as to locally reduce the cross section of the groove 12. This makes it easier to slide the probe during its introduction by reducing the contact surface area between the probe and the internal wall of the groove. Note that it is also conceivable for at least one surface portion of the internal wall to have protrusions.

Since these local narrowings can reduce the thermal contact between the probe and the plate, they can be removed locally in the area where the temperature needs to be measured, in order to improve the representativeness of the measurement. The bosses can also be exaggerated in the areas where thermal insulation is preferable, for example because the plate 2 has, in this area, a temperature very different from the one that is intended to be measured.

Note that said at least one groove 12 can open out either through a single opening situated on an edge of the plate 2 or, on one side, through an opening 5 in a longitudinal 4a or lateral 4b edge and, on the other side, through an opening 5 in the opposite longitudinal 4a or lateral 4b edge. Preferably, said openings 5 are arranged on two opposite longitudinal edges 4a. Thus, the groove 12 passes through regions with substantially identical temperatures, this avoiding any local disruption of the temperature field by the addition of heat by the probe itself.

Potentially, two probes 14 can be arranged in the groove 12, each one being inserted through one of the openings 5.

Figure 6:
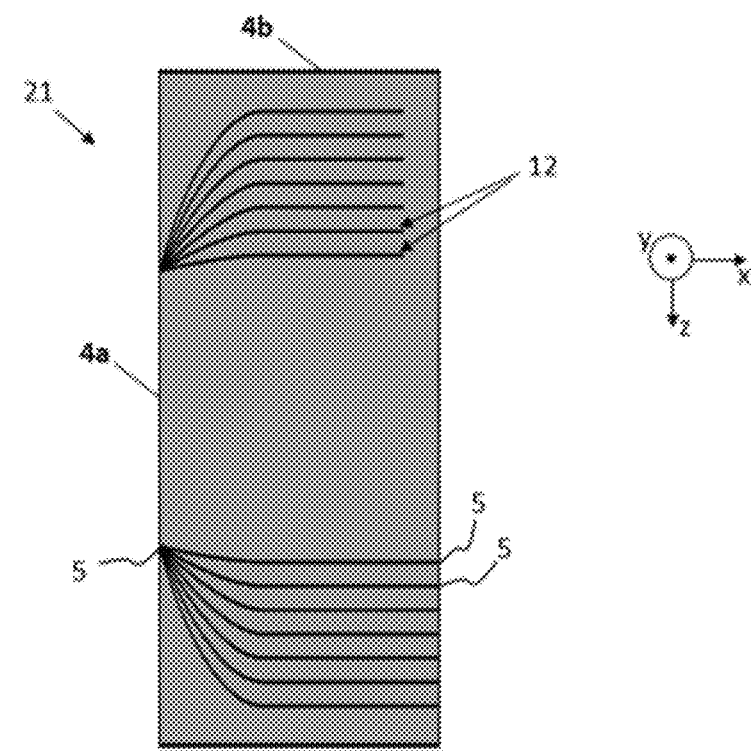
FIG. 6 schematically shows a flat product having a plurality of grooves according to one embodiment of the invention.

If one and/or the other flat product comprises a plurality of grooves, each one can lead out on at least one of the edges of the exchanger through a separate respective opening. It is also possible for the grooves 12 to meet at the opposite longitudinal 4a or lateral 4b edge in order to lead out there through a common opening 5. This is what is shown in FIG. 6. The grooves can stop within the plate 2 (on the left-hand side of the plate) or lead out on the other side through a plurality of separate respective openings 5 disposed along the opposite edge (on the right-hand side of the plate).

FIG. 6 schematically shows possible profiles of grooves 12 in longitudinal section in a plane parallel to the plates 2. Preferably, each groove comprises a rectilinear portion. Each groove may comprise a plurality of rectilinear portions that form an angle between one another, and optionally at least one curved portion. This allows a plurality of grooves to be grouped together as far as one and the same opening 5. The grooves 12 can be at least partially parallel to each other. Such an arrangement of a plurality of grooves makes it possible to measure temperatures and thermal flows at different positions along the length of the heat exchanger, in particular in order to determine where different reactions or changes of phase take place. In this way, a map of the physicochemical phenomena that can occur in the heat exchanger is obtained.

The present invention makes it possible to measure local thermal flows and/or local temperatures and thus to ascertain the local heat-exchange coefficient, this providing information relating to the local operating conditions of the heat exchangers. The method for assembling the probe is relatively simple, non-intrusive and allows excellent thermal contact between the probe and the plate to be qualified.

Of course, the invention is not limited to the particular examples described and illustrated in the present application. Further variants or embodiments within the competence of a person skilled in the art may also be envisaged without departing from the scope of the invention defined in the following claims. Note in particular that a plurality of plates 2 of the heat exchanger 1 can be formed from flat products and have at least one groove 12 with a probe 14 according to the invention, these plates being able to have different configurations, in particular a different number of grooves and/or different groove shapes, a different number of openings, openings arranged on different edges.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for manufacturing a heat exchanger of the brazed plate and fin type, comprising:
   a) stacking, in a spaced-apart manner, a set of plates parallel to one another and to a longitudinal direction thereby defining, between said plates, a plurality of passages suitable for the flow in the longitudinal direction of a first fluid to be brought into a heat-exchange relationship with at least a second fluid, said plates being delimited by a pair of longitudinal edges extending in the longitudinal direction and a pair of lateral edges extending in a lateral direction perpendicular to the longitudinal direction,
   b) forming at least one of the plates stacked in step a) by superposing, in a stacking direction perpendicular to the longitudinal and lateral directions, at least a first flat product and a second flat product on top of one another, at least one of the first and second flat products comprising at least one groove that extends parallel to the plates and leads towards the outside of the stack formed in step a) through at least one opening in a lateral or longitudinal edge,
   c) arranging at least one braze material between the first flat product and the second flat product,
   d) arranging at least one temperature probe in the groove, a free space being provided between at least a part of the temperature probe, for the one part, and the internal walls of the groove, for the other part,
   e) brazing the set of plates, including brazing the first flat product to the second flat product, with the braze material being melted and at least a part of the braze material diffusing in the first flat product and the second flat product, at least a part of the free space provided between the temperature probe and the internal walls of the groove being filled with solidified braze material.

2. The method according to claim 1, wherein the temperature probe comprises:
   a heat-sensitive part configured to measure the temperature of a surface of the plate formed in step b) at a desired location,
   electrically conductive members configured to connect the heat-sensitive part to an electrical measurement circuit, and
   a sheath forming a sleeve around the heat-sensitive part and around at least a part of the electrically conductive members, the sheath extending between a first end arranged at the heat-sensitive part and a second end arranged on the outside of the stack of plates.

3. The method according to claim 2, wherein the sheath comprises a metal material chosen from: aluminium, nickel, platinum, tungsten, an aluminium alloy, a nickel alloy, a platinum alloy, a tungsten alloy, a stainless steel, a refractory steel.

4. The method according to claim 2, wherein the sheath has a thickness of between 0.1 and 1 mm and/or an outside diameter of between 0.5 and 3 mm.

5. The method according to claim 2, wherein the sheath has a length of between 100 and 10,000 mm.

6. The method according to claim 2, wherein the sheath is deformable.

7. The method according to claim 1, wherein the temperature probe is a thermocouple probe comprising a pair of conductive wires formed from different metals, the conductive wires being joined at a junction point, known as measurement junction, forming the heat-sensitive part of the temperature probe.

8. The method according to claim 7, wherein the conductive wires are each connected to respective extension wires intended to be joined to the terminals of an electrical measurement circuit so as to form junctions known as reference junctions there, a connection piece forming a sleeve around the connections between the conductive wires and the respective extension wires thereof, said connection piece being connected to the second end of the sheath.

9. The method according to claim 7, wherein the metals forming the conductive wires are configured to form a thermocouple probe of a type chosen from: type E, type J, type K, type N, type M, type R, type S, type B.

10. The method according to claim 1, wherein the temperature probe comprises an electrically insulating material arranged between the sheath and the heat-sensitive part, in particular said electrically insulating material being chosen from: a magnesium oxide, an aluminium oxide.

11. The method according to claim 1, wherein the temperature probe is a resistance probe comprising a pair of conductive wires connected to a measurement resistor forming the heat-sensitive part of the temperature probe, the measurement resistor having, as resistance material, a ceramic material or a metal material.

12. The method according to claim 1, wherein step e) takes place in a brazing furnace, the stack of plates being situated in a first region of the furnace in which the maximum temperature during the brazing cycle is between 550 and 900° C. and the second end of the sheath being situated in a second region in which the temperature is lower than said maximum temperature in the first region.

\* \* \* \* \*